J. BUCKLEY.
STAPLE MACHINE.
APPLICATION FILED NOV. 5, 1908.

943,235.

Patented Dec. 14, 1909.
6 SHEETS—SHEET 1.

WITNESSES:
Elbert O. Hull.
Ruth Raymond.

INVENTOR
John Buckley
BY
Chamberlain & Newman
Attorneys

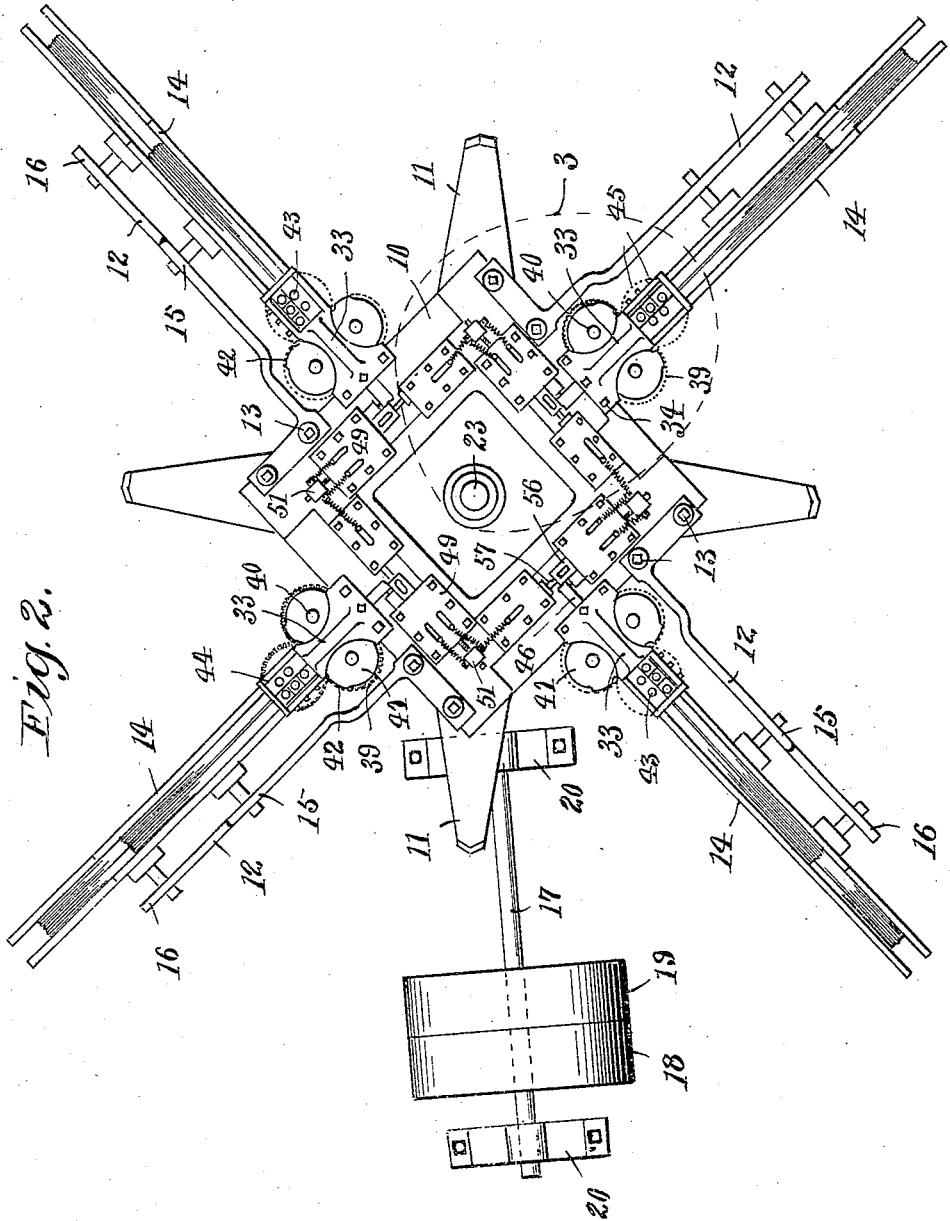

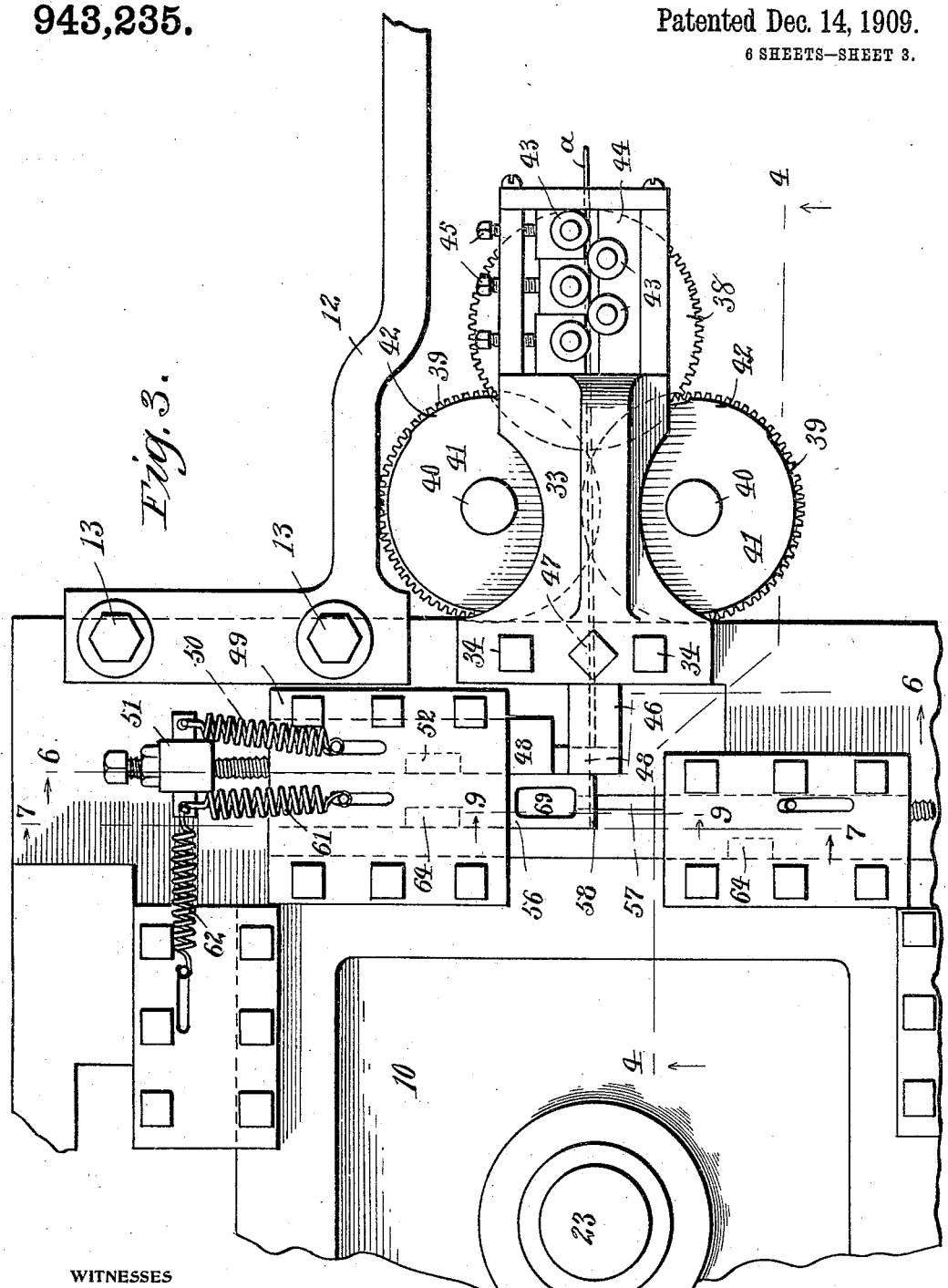

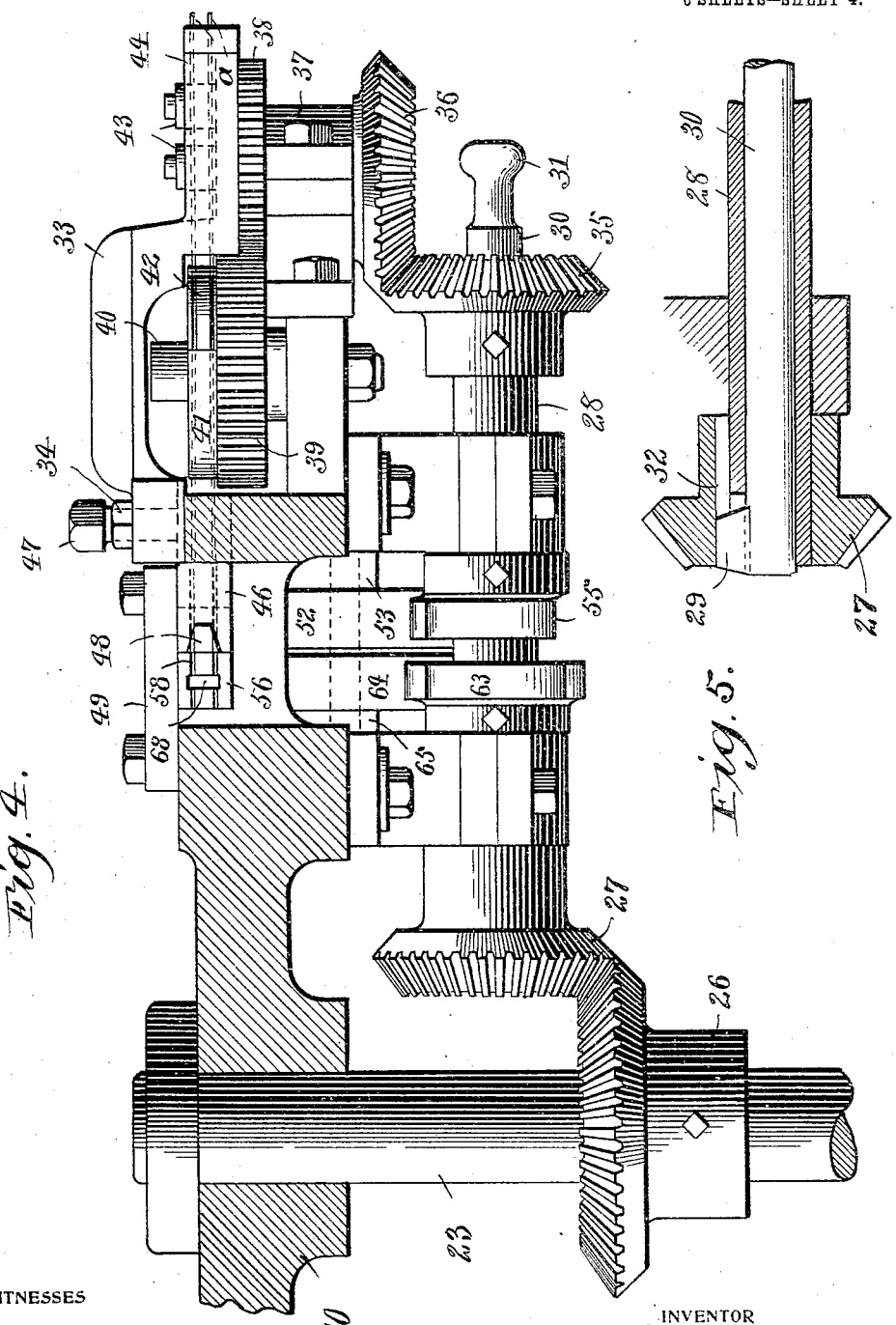

J. BUCKLEY.
STAPLE MACHINE.
APPLICATION FILED NOV. 5, 1908.

943,235.

Patented Dec. 14, 1909.
6 SHEETS—SHEET 5.

WITNESSES
Elbert O. Hull,
Ruth Raymond.

INVENTOR
John Buckley
BY
Chamberlain & Newman
ATTORNEYS

J. BUCKLEY.
STAPLE MACHINE.
APPLICATION FILED NOV. 5, 1908.

943,235.

Patented Dec. 14, 1909.
6 SHEETS—SHEET 6.

Witnesses
Ellsob O Hill,
Ruth Raymond

INVENTOR
John Buckley
BY
Chamberlain & Newman
ATTORNEYS

UNITED STATES PATENT OFFICE.

JOHN BUCKLEY, OF WATERBURY, CONNECTICUT, ASSIGNOR TO CHARLES B. SCHOEN-MEHL, OF WATERBURY, CONNECTICUT.

STAPLE-MACHINE.

943,235.  Specification of Letters Patent.  Patented Dec. 14, 1909.

Application filed November 5, 1908. Serial No. 461,116.

*To all whom it may concern:*

Be it known that I, JOHN BUCKLEY, citizen of the United States, and resident of Waterbury, in the county of New Haven and State of Connecticut, have invented certain new and useful Improvements in Staple-Machines, of which the following is a specification.

My invention relates to an improved form of machine for automatically producing wire staples, and has for its object the designing of a simple and practical construction whereby greater quantities of staples can be produced with it in a given period of time than by the old form of mechanism; to construct a machine by which staples of this class can be manufactured cheaper than has heretofore been done, and finally to plan the machine so that it can be built inexpensively and operated and maintained at a comparatively low figure.

Figure 1:
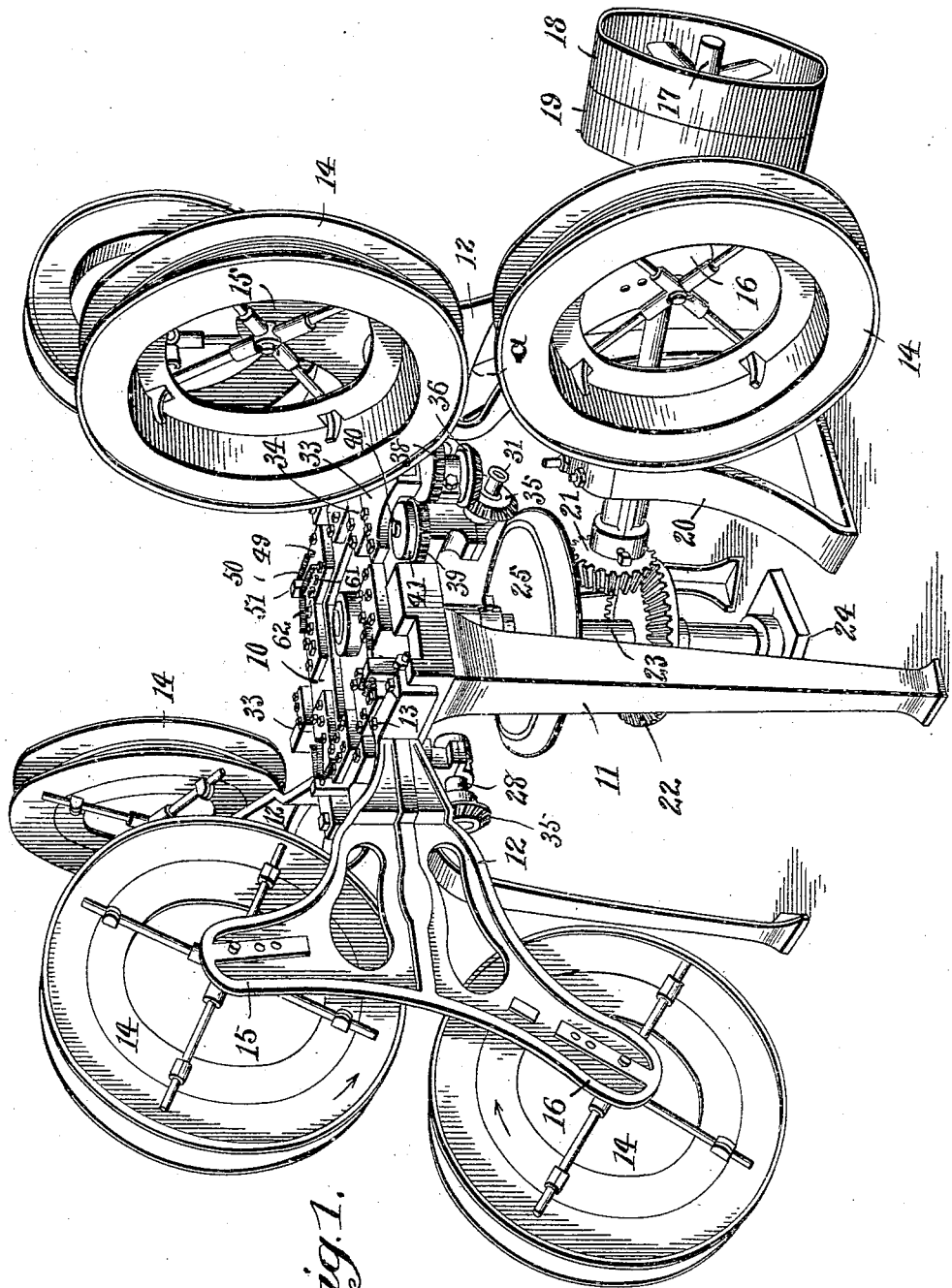
Figure 6:
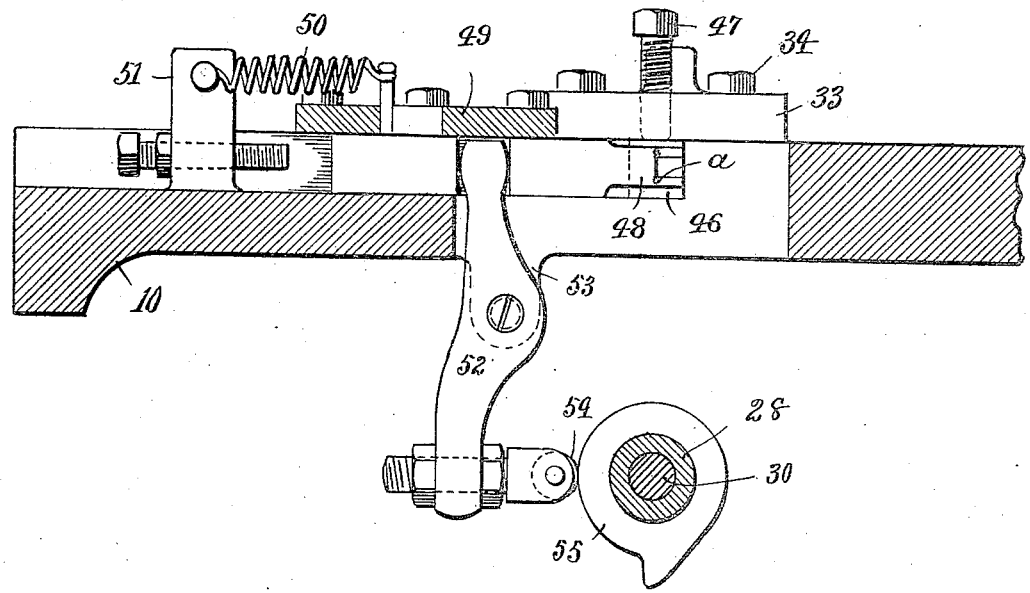
Figure 7:
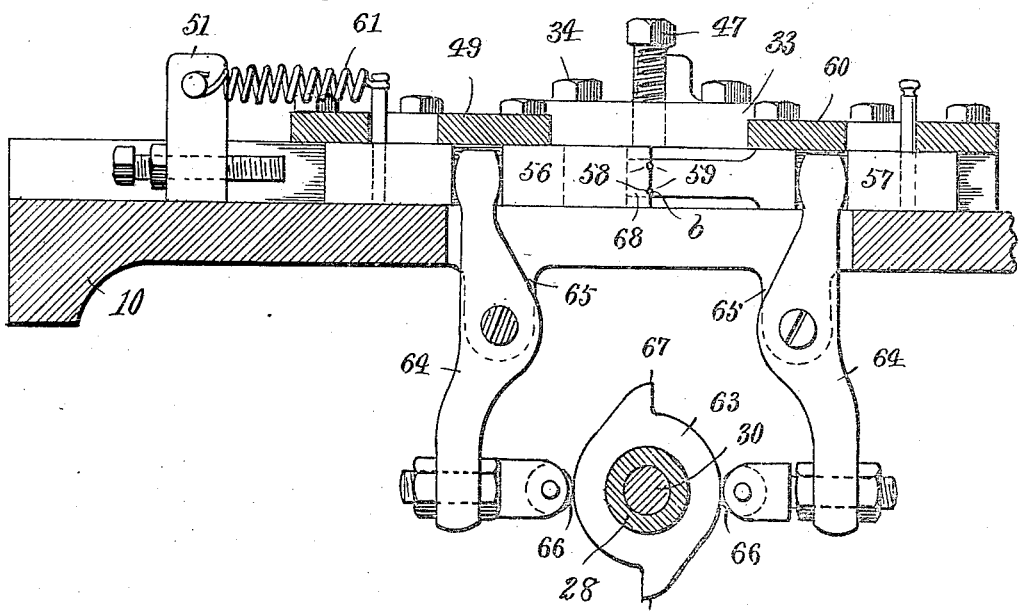
Figure 8:
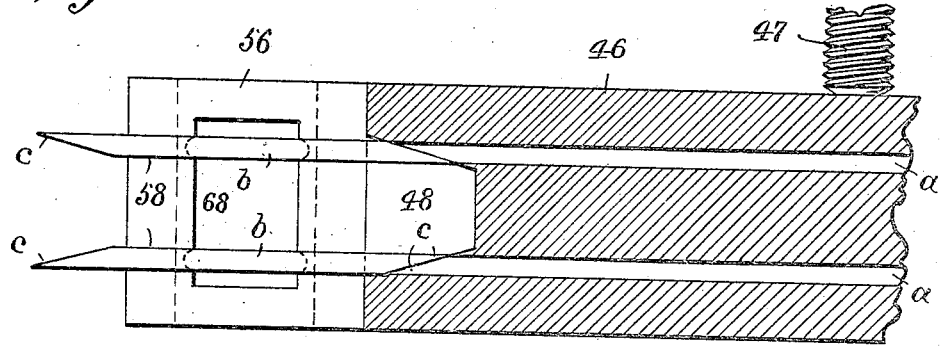
Figure 9:
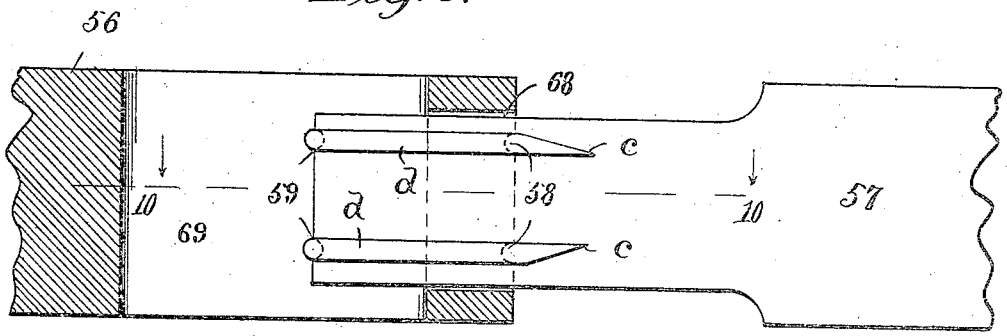
Figure 10:
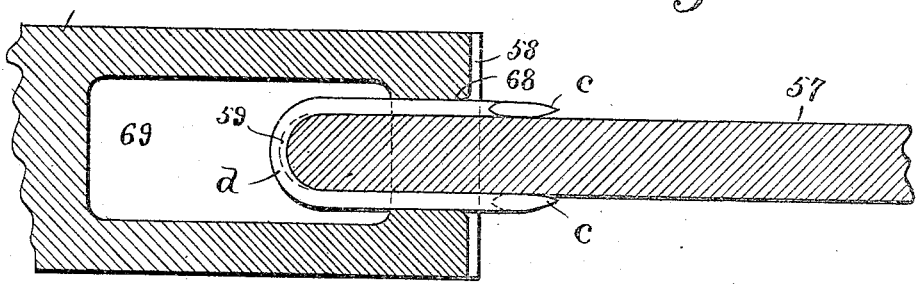

With the above and other minor objects in view my invention resides and consists in the novel construction and combination of parts shown upon the accompanying six sheets of drawings forming a part of this specification, upon which similar characters of reference denote like or corresponding parts throughout the several figures and of which, Figure 1, shows a perspective view of my improved staple machine complete. Fig. 2, is a plan view of the machine. Fig. 3, is an enlarged plan view of that portion of my machine shown inclosed by dotted line 3, in Fig. 2. Fig. 4, is a similarly enlarged sectional elevation taken through the parts shown in Fig. 3, and on line 4—4 thereof. Fig. 5, shows a detail longitudinal sectional view of a clutch through which the several staple forming devices are operated. Fig. 6, is a cross section taken on line 6—6 of Fig. 3, and showing one set of the staple folding mechanisms. Fig. 7, is a cross sectional elevation of the wire cutting mechanism taken on line 7—7 of Fig. 3. Fig 8, is an enlarged elevation of the wire cutting mechanism seen in Fig. 4, but shown partially in section and with wires therein. Fig. 9, is a similarly enlarged longitudinal section taken on line 9—9 of Fig. 3, showing the staple folding slides in the act of bending a wire, and Fig. 10, is a central horizontal longitudinal section of the slides with staple attached as shown in and taken on line 10 of Fig. 9.

As before stated my invention is designed with a view of producing a rapid production machine, and its efficiency in this particular has been demonstrated by an actual production a greater number of staples per minute than of any other machine now upon the market. This production of such a great quantity of staples in a limited time is obviously the result in part at least, of my special design of construction and the novelty involved therein.

The machine comprises a centrally arranged operating shaft geared to be driven by a common form of driving shaft and designed to be run at a rate of say, 100 turns per minute and connected to operate the several sets of wire cutting and folding devices. I preferably use four sets of these cutters and folders, each being designed to operate three times with each turn of the main shaft thus making 300 operations per minute or 1200 operations per minute with all four sets. Each set of mechanism comprises in its construction means for producing two staples with each operation thus making 600 staples per minute with each set, or 2400 from the four sets of mechanism.

The machine is further constructed in such a way that each set of mechanism can be started or stopped independently of the other sets making it possible to discontinue the use of either set at any time should occasion require, as for instance to sharpen or repair the dies.

Referring in detail to the characters of reference marked upon the drawings 10 represents the bed of the machine which is in the form of a single casting designed to receive the several fixed and movable parts later to be described in detail. This bed as shown is supported upon suitable legs 11 attached to the underside of each corner of the bed.

12 represents brackets of which there are four in number attached to the four sides of the bed by means of screw bolts 13 and serve to support the reels 14 carrying the wire supply from which the staples are formed. There are two reels mounted upon each bracket and they are practically alike in construction one being adjustably mounted in an upwardly disposed arm 15 of the bracket while the other is similarly supported in a downwardly disposed arm 16 of said bracket. The reels are free to be turned by the wire feeding mechanism and both turn inward as per arrows indicated in Fig. 1, thereby presenting the wires *a—a* in line with the feeding devices and one slightly above the other.

17 represents a driving shaft bearing tight and loose pulleys 18 and 19 respectively, by means of which the shaft is driven. This shaft is journaled in bearings 20 secured to the floor and upon the inner end of the shaft is mounted a beveled gear 21 which meshes with and drives a larger beveled gear 22 secured to a vertical main shaft 23. The upper end of the shaft is journaled in the bed 10 of the machine while the lower end is mounted in a bearing 24 attached to the floor. A balance wheel 25 is also secured to this shaft to insure a smooth and even operation of the machine. A small beveled gear 26 is attached to the upper portion of the said shaft 22 to engage the several gears 27 of the shafts of the respective staple forming devices, of which as before stated there are four in number. These staple formers including their respective wire feeding devices are located in the top and the respective four sides of the bed as will be clearly seen from Fig. 2, and they are alike in construction, each being separately connected and operated through the gears 26 and 27 just mentioned. The gears 27 are continuously driven from the driving shaft 23 through the gear 26 and are each adapted to be engaged with and disengaged from their shafts 28 through a clutch 29 carried by a rod 30 slidably mounted within the shaft 28 and bearing a knob 31 whereby the said rod may be shoved in or out and its clutch 29 made to engage with or disengage from the slot 32 of the said gear 27, see Fig. 5. By this means the several sets of staple forming mechanisms may be independently thrown in or out as occasion may require.

Each of the wire feeding mechanisms as designed serve to simultaneously feed in two wires one of which is arranged above the other and whereby two staples may be simultaneously formed by the cutting and folding dies and slides later to be described. This mechanism is obviously located substantially in line with the adjacent peripheral surfaces of the reels 14 mounted in the bracket 12 and include not only means for drawing the wire inward from the reels but also devices for straightening the wire. This feeding mechanism is supported upon a bracket 33 attached to the bed of the machine by screws 34 and is operated through the bevel gear 35 attached to the shaft 28 and meshing with and driving the bevel gear 36 secured to a short shaft journaled in a bearing 37 and carrying a gear 38. The gear 38 meshes with and drives a pair of gears 39 oppositely arranged and mounted upon separate studs 40 secured to the lower portion of bracket 33 and to the upper side of each of these gears 39 is secured a roll 41 having an enlargement 42 upon one side that is provided with an upper and lower groove to engage the wires *a*. These gears and rolls would be so arranged and timed as to insure the joint operation of the two enlargements so as to cause them to register with each rotation, thus jointly gripping the two wires and drawing a predetermined length of them forward and through the straightening rolls 43 mounted within the box 44 formed in the outer end of the bracket 33. The straightening rolls upon one side are mounted in movable bearings adapted to be adjusted by means of screws 45. A die 46 having two longitudinal holes therethrough is secured within the bed in line with the feeding devices by means of a set screw 47. The transverse central inner end portion of this die (see Fig. 4) is cut away to receive the operative end of the cutting slide 48 and whereby the blank *b* is severed. The upper and lower surfaces intermediate of the end of the die 46 and the slide 48 are at an acute angle to the line of movement of the wire thus serving to cut the same on the bias whereby producing sharpened ends *c* to the wires and to form points for the staple when the same is completed. The said slide 48 is mounted in a suitable pocket of the bed of the machine and is covered by a removable plate 49, being normally held outward by the spring 50 one end of which is attached to a projecting pin of the slide and the other end to the post 51. The slide is thus adapted to reciprocate, being shoved inward to cut both wires against the action of the said spring 50 through the medium of a vertically disposed lever 52 pivoted in a depending bracket 53 of the bed, the upper end of said lever being shaped to engage a recess in the slide, while the lower end is provided with a roll 54 to engage a cam 55 mounted upon the shaft 28.

The wire is obviously fed inward past the cutting dies preparatory to the cutting operation with the result that when the same has been severed the two blanks *b* are disposed crosswise in grooves across the face of the slide 56 (see Fig. 8,) and intermediate of it and the male slide 57 whereby it is held preparatory to the closing operation, each of these slides 56 and 57 are provided with transverse grooves 58 and 59 respectively, in their operative end portions which register with each other and serve to receive and support the wires as they are fed through from the cutting dies. The slides are mounted in suitable pockets of the bed the one 56 being covered by the before mentioned plate 49 and the other 57 by a similar plate 60. They are also provided respectively with springs 61 and 62 intermediate of pins of the slides and the posts 51 before mentioned. These springs normally hold the slides outward, while a double acting cam 63 serves to throw them in through the medium of the vertically disposed levers 64 journaled upon depending brackets 65 of the bed 10 and bearing rolls 66 to engage the opposite faces of the cam in a manner to be operated by the oppositely located lugs 67 of the said cam 63. The operative end of the slide 56 is provided with a central longitudinal opening 68 which communicates with a large opening 69 extending through the slide vertically. The first mentioned opening 68 serves to receive the small end portion of the slide 57 which when shoved therein serves to bend the blanks $b$ intermediate of their length to form them into U shaped staples $d$ (see Figs. 9 and 10). After the blanks are bent in this manner and the staples formed and shoved through the longitudinal opening, the side portions of such staples naturally spring out a little so that when the slides are drawn back the ends of the staples engage the sides of the opening 69 and are stripped off and permitted to drop therefrom to the floor or in a suitable receptacle placed therebeneath to receive them. It will thus be seen that the folding of the blank is accomplished by a joint movement of the two slides both of which move in and out simultaneously past the line of the wire feed, thereby not only dividing the strain to the operations more evenly, but also making it possible to operate the machine faster.

From the foregoing it will be noted that when in complete operation there are four pairs of wires being fed into the machine, each of which produces a blank with the ends cut upon the bias to form points for the staples, likewise that the respective pairs of blanks are simultaneously folded by means of the slides before mentioned and then dropped from the machine.

Having thus described my invention what I claim and desire to secure by Letters Patent is:—

1. In a staple forming machine, the combination with a shaft, of gear and roll connections for simultaneously feeding two wires, a stationary die having two wire passages therethrough, a cutting slide to operate in conjunction with the die, a pair of folding slides both adapted to receive the two blanks when severed, one slide having a central recess in its end and the other a reduced portion to operate in the recess to fold and shove the blank therethrough to form a staple.

2. In a staple forming machine, the combination with a shaft, of wire feeding devices connected to be operated by the shaft, for simultaneously feeding a pair of wires, a fixed and movable die for simultaneously cutting a pair of blanks from the two wires, a cam upon the shaft with connections for operating the sliding die, a second pair of slides for gripping the blanks and folding the staples, and cams mounted upon the shaft and connections for operating the two slides whereby the same are simultaneously operated.

3. In a staple machine, the combination with feeding and cutting mechanism, of a pair of folding slides, one constituting a male and the other a female slide, each having a pair of transverse grooves in their end faces to receive a pair of wire blanks, an opening in the end of one of the slides through which the other slide operates and forces the said blanks to fold the staple and having an enlargement of the opening within the inner portion of slide whereby the two staples are released from the dies and are discharged from the machine.

4. In a staple forming machine, the combination with a driving shaft, of wire feeding devices connected therewith for simultaneously feeding a pair of wires, a fixed and movable die for simultaneously cutting a pair of blanks from the two wires, a male and female holding slide adapted to receive, grip and bend a pair of straight wire blanks into U shaped staples, said slides both having a pair of cross and longitudinal grooves in their ends and side portions to receive and support the staple blanks.

5. In a staple forming machine, the combination with a main driving shaft, of wire feeding mechanism for simultaneously feeding forward two strands of wire, a fixed die having two longitudinal wire passages therein and a transverse recess across its end portion, a cutting slide fitted to engage the recess and adapted to operate at a right angle to the line of movement of the wire to cut therefrom two wire blanks, and a male and female die adapted to receive the said blanks and to simultaneously form two staples therefrom.

Signed at Waterbury, in the county of New Haven, and State of Connecticut this 29th day of October, A. D., 1908.

JOHN BUCKLEY.

Witnesses:
ROBERT A. LOWE,
C. B. SCHOENMEHL.